March 9, 1926.

W. M. SMITH 1,576,373

POWER GENERATOR

Filed March 7, 1925

5 Sheets-Sheet 2

Inventor
William M. Smith

By Bryant & Lowry
Attorneys

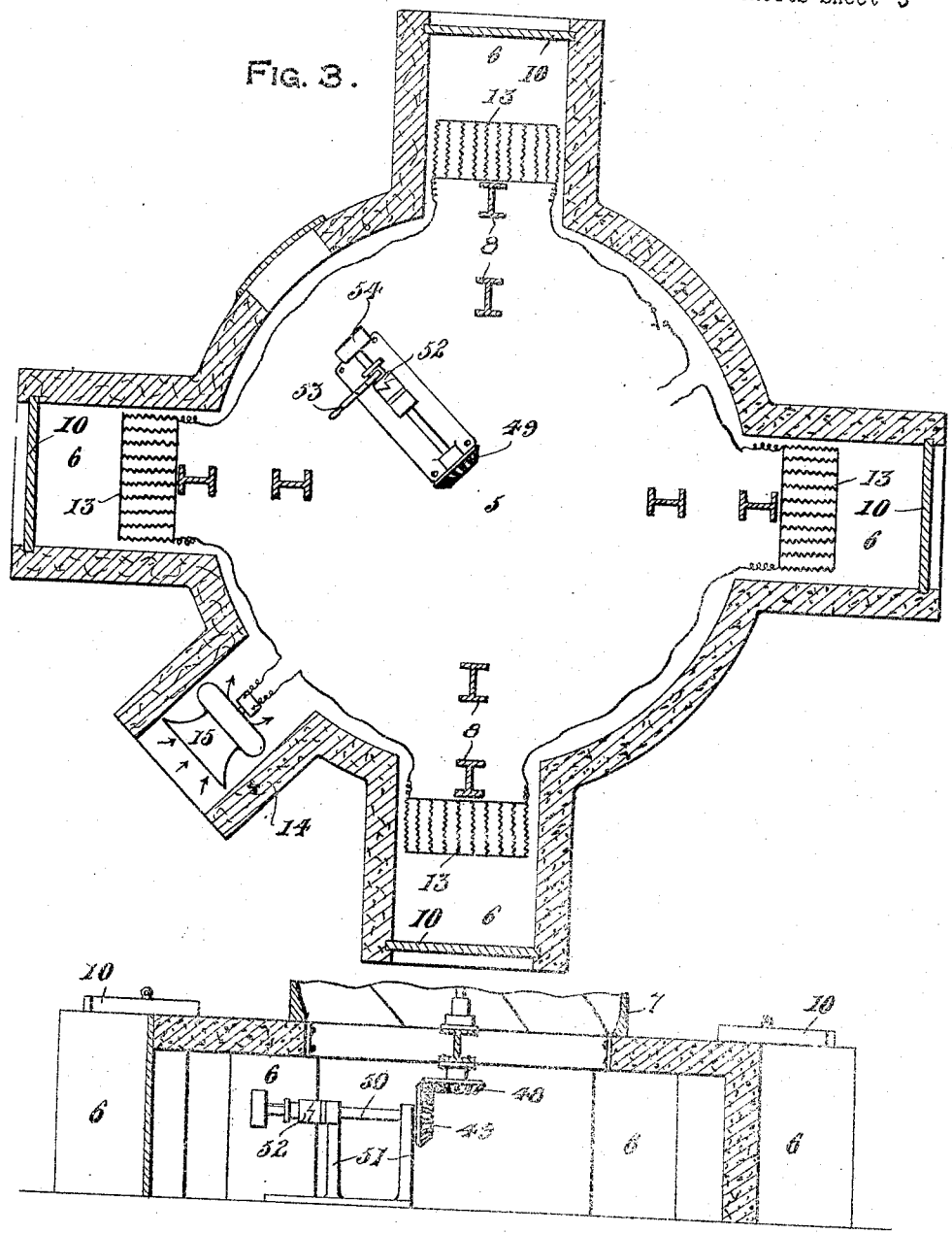

March 9, 1926.
W. M. SMITH
POWER GENERATOR
Filed March 7, 1925
1,576,373
5 Sheets-Sheet 4
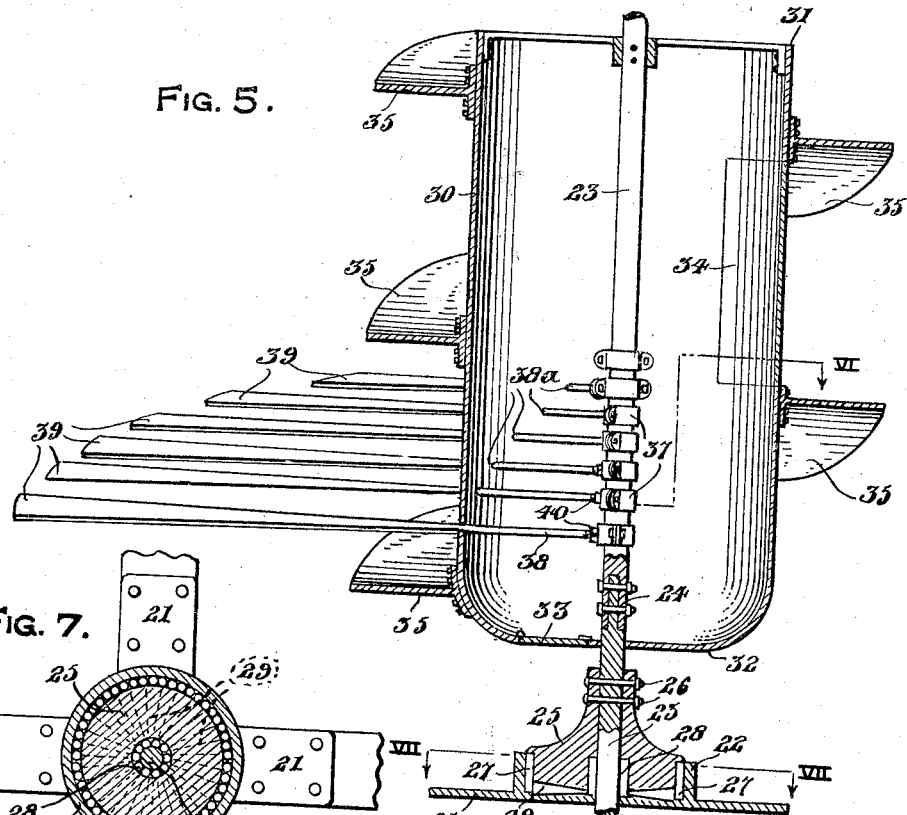
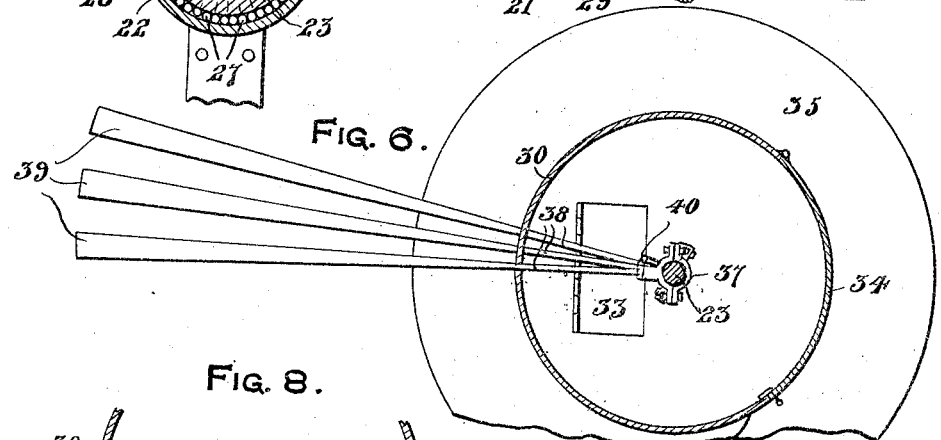
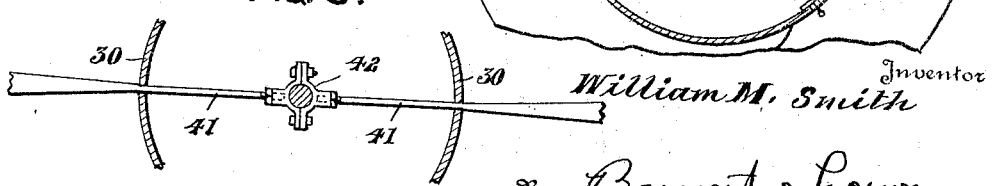
Inventor
William M. Smith
By Bryant & Lowry
Attorneys

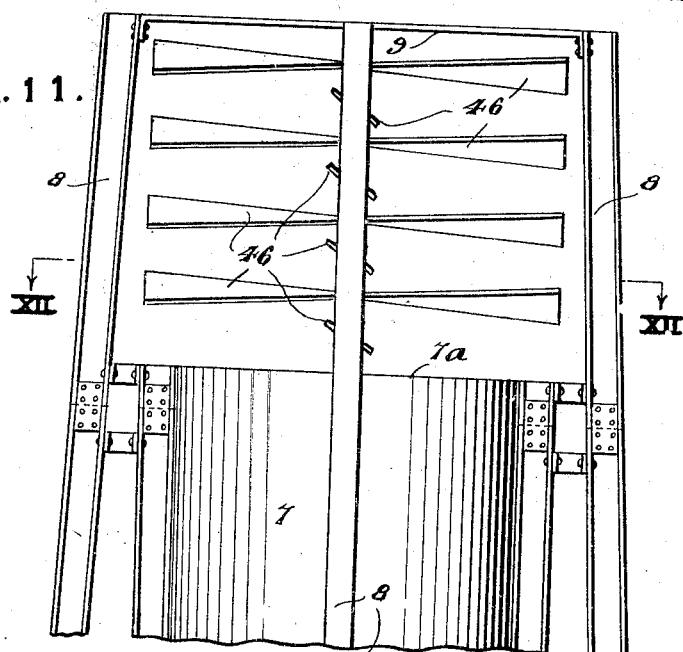
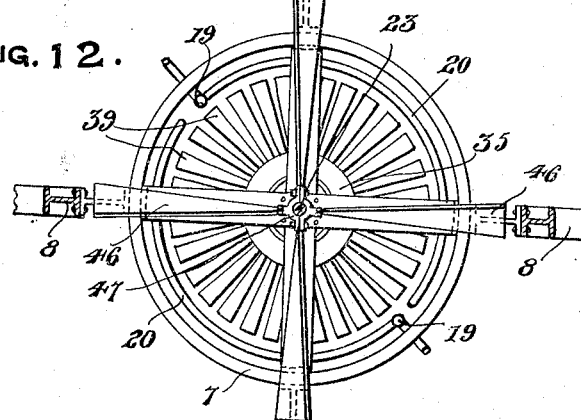
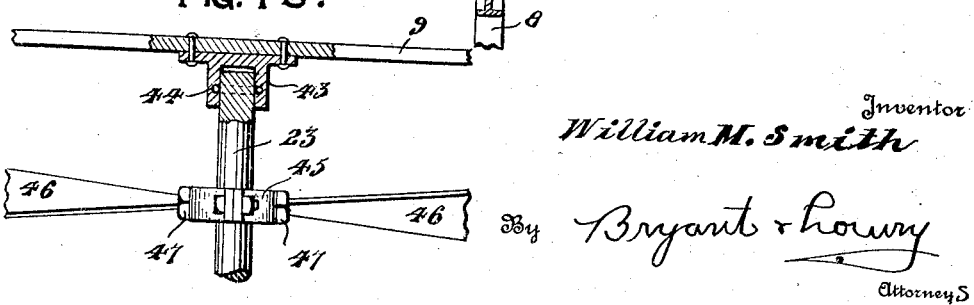

Patented Mar. 9, 1926.

1,576,373

UNITED STATES PATENT OFFICE.

WILLIAM M. SMITH, OF TURTLE CREEK, PENNSYLVANIA.

POWER GENERATOR.

Application filed March 7, 1925. Serial No. 13,737.

*To all whom it may concern:*

Be it known that I, WILLIAM M. SMITH, a citizen of the United States of America, residing at Turtle Creek, in the county of Allegheny and State of Pennsylvania, have invented certain new and useful Improvements in Power Generators, of which the following is a specification.

This invention relates to improvements in elastic fluid power generators.

The primary object of this invention is to provide an improved form of power generator of the type adapted to be driven by a flow of elastic fluid, such as air.

A further object of the invention is to provide a power generator of the above mentioned type wherein the driving medium employed is the nature flow of air through a stack.

A still further object of the invention is to provide artificial means for boosting the air within the stack to increase the speed of travel of the same, whereby the generated power will be increased proportionately.

Other objects and advantages of the invention will be apparent during the course of the following description.

Figure 1:
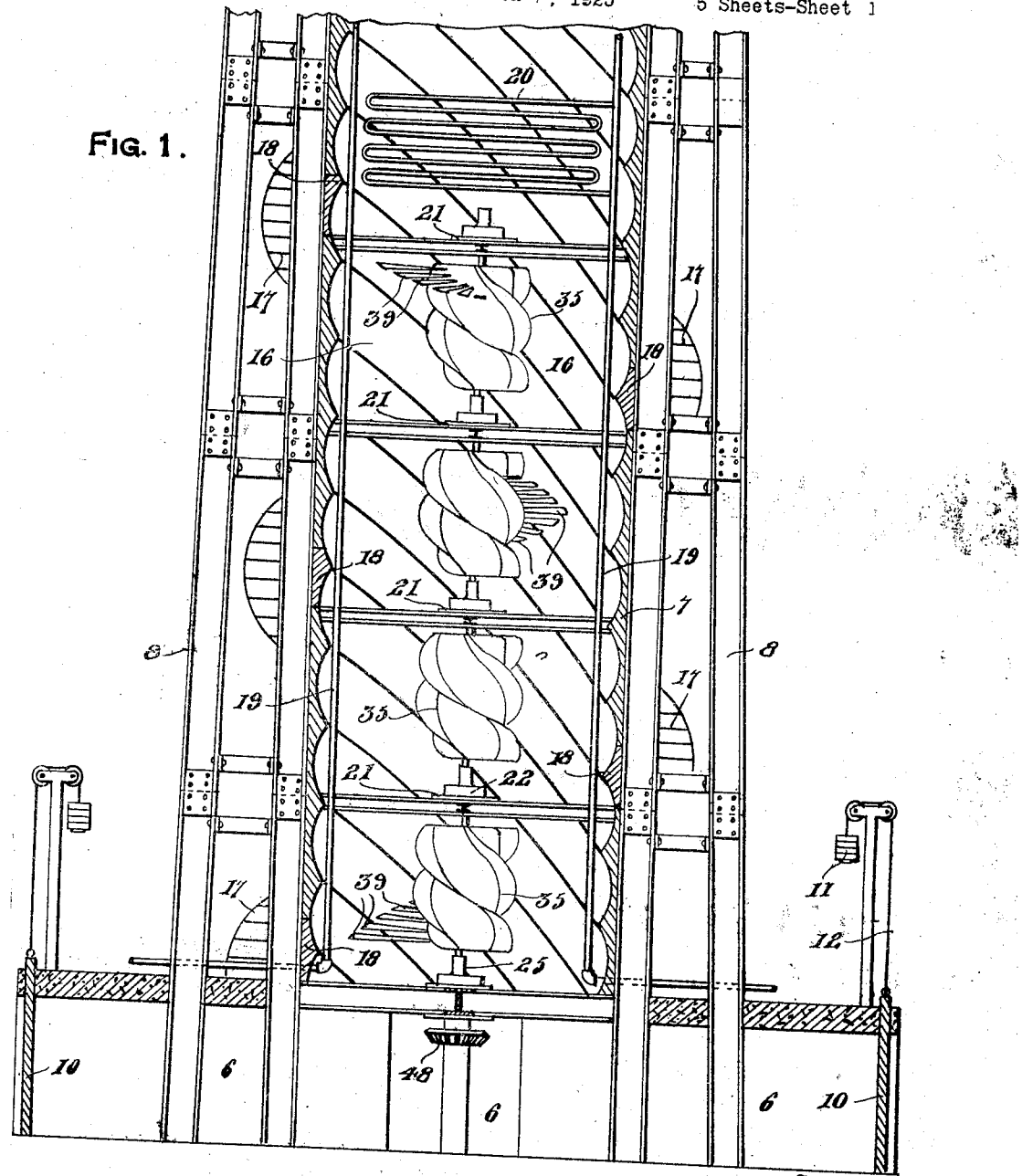
Figure 2:
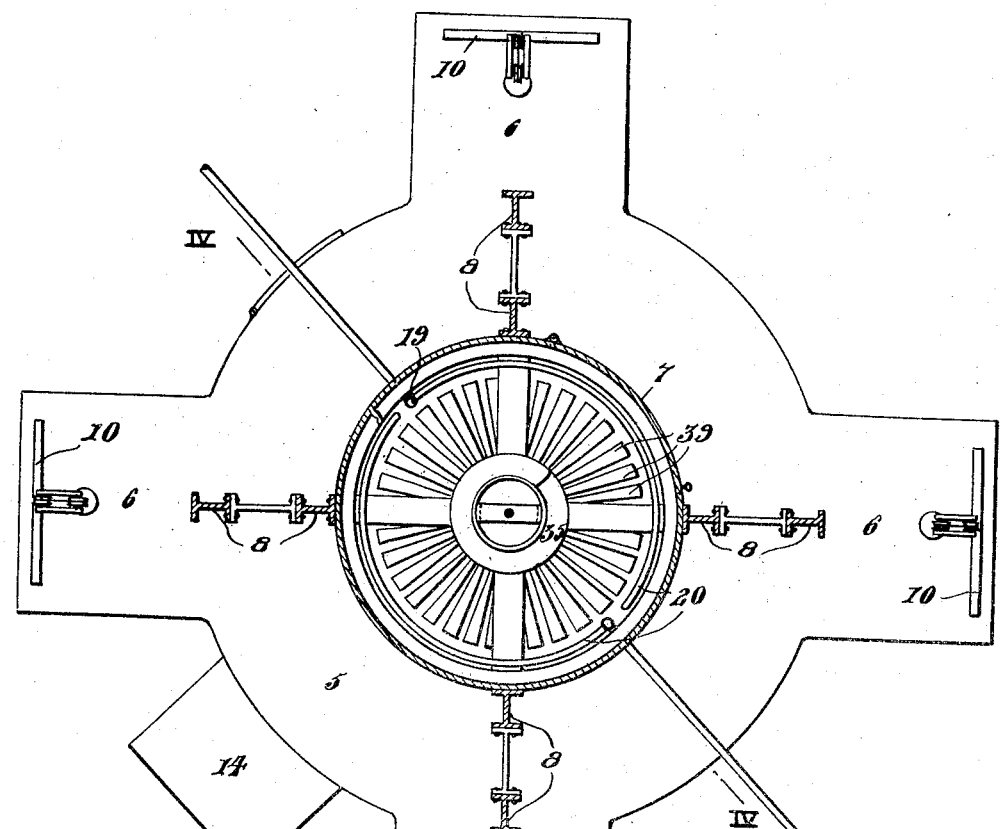
Figure 10:
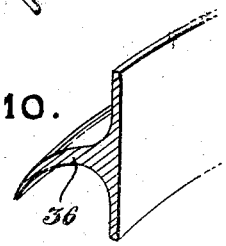
Figure 9:
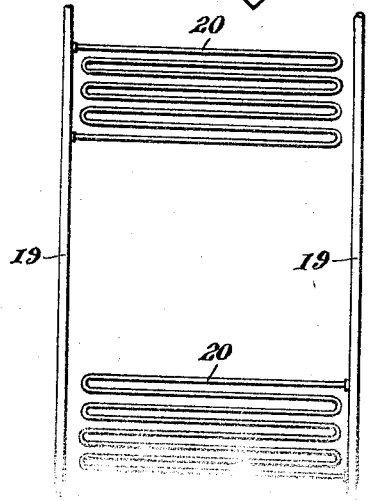

In the accompanying drawings forming a part of this specification and in which like numerals are employed to designate like parts throughout the same, Figure 1 is a fragmentary vertical sectional view of the power generator embodying this invention, Figure 2 is a transverse sectional view of the structure shown in Fig. 1, Figure 3 is a transverse sectional view of the base portion of the structure shown in Fig. 1, Figure 4 is a fragmentary vertical sectional view of the base portion shown in Fig. 3, Figure 5 is a detail vertical sectional view of one of the shaft driving units shown in elevation in Fig. 1, Figure 6 is a transverse sectional view taken upon line VI—VI of Fig. 5, Figure 7 is a transverse sectional view taken upon line VII—VII of Fig. 5, Figure 8 is a modified form of blade structure used in combination with the unit shown in Figs. 5 and 6, Figure 9 is a detail elevational view of a heating system employed in connection with the generator shown in Fig. 1 and constitutes means for heating the air current passing upwardly through the stack portion of the generator, Figure 10 is a detail perspective view of a modified form of vane employed in connection with the units shown in Figs. 5 and 6, Figure 11 is a fragmentary elevational view of the upper portion of the power generator embodying this invention, Figure 12 is a transverse sectional view taken upon line XII—XII of Fig. 11, and Figure 13 is a detail elevational view, partly broken away, of the mounting for the upper end of the power shaft of the generator embodying this invention.

In the drawings, wherein for the purpose of illustration is shown a preferred embodiment of this invention, the numeral 5 designates the hollow base portion formed with the communicating, radially extending passageways 6 through which air is permitted to enter the base 5. Extending perpendicularly from the base 5 and arranged concentrically therewith is a stack 7 which is supported or braced by the diametrically arranged pairs of interconnected I-beams 8, the outer beams in each pair being illustrated in Fig. 11 as extending beyond the upper end 7ª of the stack 7 for being connected by the transversely extending brace bars 9.

In Figs. 1 to 4 inclusive the passageways 6 are illustrated as being provided with vertically movable doors or valves 10 which may be regulated to vary the amount of air admitted to the hollow base 5, the doors or valves 10 being maintained or held at any desired elevation by means of the weights 11 connected to the members 10 by the cords 12. In Fig. 3, each passageway is illustrated as being provided with an electric heating element 13 employed for heating the flow of air passing through the same. An additional entrance or passageway 14 is shown and is provided with a suction pump 15 by means of which air may be drawn into the stack 7.

In Figs. 1 and 4 the bore of the stack 7 is illustrated as being formed with spirally extending grooves 16 which operate to cause the current of air passing upwardly through the stack to whirl spirally. This whirling movement is intended to increase the speed of the power shaft, to be described at a later point, by impinging against the surfaces of the generally, spirally formed power units carried by said shaft.

To permit ready access to be had with the bore of the stack 7, a stairway 17 winds spirally around the said stack and permits a person to enter the bore of the latter through the doors 18 which open thereto.

For the purpose of heating the current of air passing upwardly through the bore of the stack, a steam system 19 is arranged in the said bore and includes the coil sections 20, as best illustrated in Figs. 1, 2 and 9.

Arranged at suitable intervals throughout the length of the stack 7 are the transversely extending I-beams 21 which are employed for supporting the power shaft extending upwardly through the said stack. Each I-beam 21 is shown in Figs. 5 and 7 as being provided with a drum-shaped bearing box 22 having extending therethru the upper end portion of a shaft section 23. It is to be understood that this power shaft is formed of a plurality of shaft sections 23 bolted together, as at 24, at their adjacent ends. Each shaft section is provided with a wheel-like body 25 which is bolted thereto as at 26. Mounted within the drum 22 and interposed between the bottom and peripheral walls of the wheel-like body 21 are the roller bearings 27, 28, and 29, the roller bearings 29 acting as thrust bearings for supporting the shaft sections against longitudinal downward movement.

Each shaft section has suitably mounted thereon a cylindrically-shaped hollow body 30 which is open at its upper end 31 and closed at its lower end 32. The bottom wall 32 of each cylindrical body is provided with a door 33 by means of which a mechanic may gain entrance to the interior of the said body. The side wall of each cylindrical body is also provided with a door 34 which permits access to the interior of the body.

Suitably bolted to the periphery of each cylindrically-shaped body are a plurality of vanes 35 which wind spirally therearound. These vanes may be formed to extend truly laterally, as shown in Fig. 5 or they may be curved outwardly and downwardly, as shown at 36 in Fig. 10.

Each shaft section has mounted thereupon, within the bore of its hollow cylindrically-shaped body 30 a plurality of clamps 37 which are arranged one above the other and have projecting laterally from each a blade stem 38 which extends outwardly thru the side wall of the cylindrically-shaped body 30 and is formed into a blade 39. It will be seen that these blade stems 38 project through the openings 38ª in the wall of the member 30 which openings 38ª are arranged in a spiral path, as best illustrated in Figs. 5 and 6. This arrangement of blades 39 will cause the upward current of air to impinge against their bottom faces for aiding the vanes 35 in driving the sectional power shaft. It will be seen by inspecting Figs. 5 and 6 that the blade stems 38 are threaded into the clamps 37, and are provided with lock nuts 40 by means of which the blades may be adjusted for varying their transverse inclinations and for locking said blades in such adjusted positions.

It will be seen by inspecting Figs. 1 and 2 that the blades 39 of the various cylindrically-shaped bodies 30 are arranged around all of the same to form one complete spiral. If desired, however, the structure shown in Fig. 8 may be employed which includes a pair of laterally projecting blades 41 carried by each clamp 42, which is of a double construction.

The mounting for the upper end of the upper section of the power shaft is shown in Fig. 13 as including a bearing box 43 fastened to the transversely extending brace bars 9 and having the shaft section 23 journaled therein and supported by the ball bearings 44. In Figs. 11 to 13 inclusive, this upper end of the upper shaft section is illustrated as projecting beyond the upper end 7ª of the stack. This projecting shaft section is intended to be provided with a plurality of clamp structures, as best illustrated in Fig. 13, which are designated by the numeral 45. Each clamp structure 45 is provided with a pair of diametrically opposed blades 46 which are threaded at their inner ends into the clamp structures 45 and are provided with lock nuts 47 by means of which they may be maintained in different positions for varying their transverse inclination.

In Figs. 1, 3 and 4 the lower end of the power shaft is illustrated as having keyed thereto a bevel gear 48 which constantly meshes with a bevel gear 49 carried by a horizontally extending shaft 50 mounted in the bracket bearings 51. A clutch structure 52 is mounted upon this shaft 50 and is controlled by the shift lever 53, as best illustrated in Fig. 3. This clutch structure is employed for selectively connecting the pulley 54 to the shaft for permitting power to be taken off of the latter thereby.

It is now believed that the features of construction of this power generator will be clearly understood from the above detail description.

The operation of this power generator may be described as follows:—

It will be understood that with all of the valves or doors 10 closed, the only air entrance into the hollow base will be through the passageway 14 which entrance is provided with the suction pump 15. If desired, this pump may be operated for drawing air into the hollow base 5 while all of the gates or valves 10 are closed. The air sucked into the hollow base 5 will naturally pass upwardly through the stack 7 and will be caused to whirl spirally through the same by the grooves 16 formed therein. This spirally whirling air will impinge against the vanes 35 and the blades 39, carried by the cylindrically-shaped bodies 30 and will cause the said bodies, which are rigidly fastened to the power shaft sections 23, to rotate for driving the said power shaft. Due to the necessarily rigid characteristics of the vanes 35, any adjustability of the same is impossible. In view of the desirability of being able to adjust the angularity of the air impinging surfaces carried by the cylindrical bodies 30, to produce more minute control of the speed of the shaft sections, the blades 39 are provided and are made adjustable. It is also considered that the upwardly traveling air current in close proximity to the grooved wall of the stack will have a more pronounced spiral whirl than will the air currents close to the cylindrical bodies and, for this reason, it is considered more advisable to provide the solid vanes close to the bodies 30 and the spaced blades 39 to function close to the grooves 16, whereby any danger of dead or back-traveling air close to the grooved walls, likely to be produced by solid vanes at this point, will be eliminated. The power produced by the rotating of this shaft may be utilized by connecting any desired apparatus to the pulley 54 carried by the horizontal shaft 50. If desired, the speed of rotation of the power shaft may be increased by opening any one or all of the doors or valves 10 for permitting air to pass into the base 5 through the passages 6. It is to be understood that the air may be admitted to the base 5 through the passages 6 without necessitating the operating of the section pump 15.

For the purpose of increasing the speed of travel of the air through the bore of the stack 7, the electric heating elements 13 may be supplied with electricity. To further increase the speed of travel of the air, the steam heating system 19 with its radiator coils 20 may be supplied with steam. It will be understood that this steam heating system will raise the temperature of the air within the bore of the stack for causing the air to more rapidly travel upwardly therethrough.

The blades 46 carried by the upper projecting end of the power shaft are provided for utilizing the heated air discharged from the upper end of the stack to aid in driving the power shaft. The air discharged from the upper end 7ª of the stack 7 will impinge against the lower faces of these blades 46 for providing additional means to drive the power shaft.

It is now believed that the operation of this power generator will be completely understood by those skilled in the art. It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a power generator of the type described, a stack having an open upper end, means for admitting air into said stack at its lower end, a rotatable shaft extending axially through said stack, said shaft consisting of a series of connected sections, a cylindrically-shaped body mounted on each shaft section, a plurality of vanes extending spirally around each of said bodies against which the air passing upwardly through said stack may impinge to cause rotation of said shaft, and a plurality of blades extending laterally from each cylindrically-shaped body and arranged in a spiral series.

2. In a power generator of the type described, a stack having an open upper end, means for admitting air into said stack at its lower end, a rotatable shaft extending axially through said stack, said shaft consisting of a series of connected sections, a cylindrically-shaped body mounted on each shaft section, a plurality of vanes extending spirally around each of said bodies against which the air passing upwardly through said stack may impinge to cause rotation of said shaft, and a plurality of blades extending laterally from each cylindrically-shaped body and arranged in a spiral series, said blades being adjustable to vary the transverse inclination of their air contacting surfaces.

3. In a power generator of the type described, a stack having an open upper end, means for admitting air into said stack at its lower end, a sectional shaft rotatably mounted in said stack and projecting from the upper end thereof, a cylindrically-shaped body mounted on each shaft section, means carried by each of said bodies and extending spirally therearound against which the upwardly traveling air current may impinge to cause rotation of said shaft, and a plurality of transversely inclined blades carried by the projecting end of said sectional shaft against which the air current leaving the upper end of the stack may impinge for aiding in driving the sectional shaft.

4. In a power generator of the type described, a stack, a sectional shaft journaled in the bore thereof, an anti-friction bearing support for the upper end portion of each shaft section, a cylindrically-shaped hollow body rigidly fastened to each shaft section, a plurality of vanes bolted to the periphery of each body and extending spirally therearound, and a plurality of blades clamped one above the other to each shaft section within its cylindrically-shaped body and projecting laterally from the shaft section through the wall of its cylindrical body.

5. In a power generator of the type described, a stack, a sectional shaft journaled in the bore thereof, an anti-friction bearing support for the upper end portion of each shaft section, a cylindrically-shaped hollow body rigidly fastened to each shaft section, a plurality of vanes bolted to the periphery of each body and extending spirally therearound, and a plurality of blades clamped one above the other to each shaft section within its cylindrically-shaped body and projecting laterally from the shaft section through the wall of its cylindrical body, said blades being adjustable to vary the transverse inclination of the same.

In testimony whereof I affix my signature.

WILLIAM M. SMITH.